US012603086B2

(12) United States Patent
Baladhandapani et al.

(10) Patent No.: US 12,603,086 B2
(45) Date of Patent: Apr. 14, 2026

(54) CONTEXTUAL EDITABLE SPEECH RECOGNITION METHODS AND SYSTEMS

(71) Applicant: HONEYWELL INTERNATIONAL INC., Charlotte, NC (US)

(72) Inventors: Gobinathan Baladhandapani, Madurai (IN); Hariharan Saptharishi, Madurai (IN); Sivakumar Kanagarajan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 316 days.

(21) Appl. No.: 17/654,845

(22) Filed: Mar. 15, 2022

(65) Prior Publication Data

US 2023/0215431 A1 Jul. 6, 2023

(30) Foreign Application Priority Data

Jan. 5, 2022 (IN) .............................. 202211000590

(51) Int. Cl.
 *G10L 15/22* (2006.01)
 *G06F 3/16* (2006.01)
 *G08G 5/21* (2025.01)

(52) U.S. Cl.
 CPC .............. *G10L 15/22* (2013.01); *G06F 3/167* (2013.01); *G08G 5/21* (2025.01); *G10L 2015/223* (2013.01); *G10L 2015/228* (2013.01)

(58) Field of Classification Search
 CPC ... G10L 15/22; G10L 15/00; G10L 2015/223; G06F 3/167; G06F 3/04817; G08G 5/0021; G08G 5/0043
 See application file for complete search history.

(56) References Cited

U.S. PATENT DOCUMENTS

| | | |
|---|---|---|
| 4,725,956 A | 2/1988 | Jenkins |
| 6,173,192 B1 | 1/2001 | Clark |
| 6,992,626 B2 | 1/2006 | Smith |
| 7,606,715 B1 | 10/2009 | Krenz |

(Continued)

FOREIGN PATENT DOCUMENTS

| | | |
|---|---|---|
| AU | 2015210460 B2 | 4/2017 |
| CN | 110335609 A | 10/2019 |

(Continued)

*Primary Examiner* — Paras D Shah
*Assistant Examiner* — Nadira Sultana
(74) *Attorney, Agent, or Firm* — Ingrassia Fisher & Lorenz LLP

(57) ABSTRACT

Methods and systems are provided for assisting operation of a vehicle using speech recognition. One method involves recognizing an audio input as an input voice command including a commanded value for an operational subject, automatically identifying an expected value for the operational subject that is different from the commanded value, providing a graphical representation of the input voice command on a graphical user interface (GUI) display and providing a selectable GUI element associated with the expected value for the operational subject on the GUI display. After selection of the selectable GUI element, a destination system associated with the vehicle is commanded to execute a command corresponding to the input voice command using the expected value for the operational subject.

17 Claims, 6 Drawing Sheets

(56) References Cited

U.S. PATENT DOCUMENTS

| | | | |
|---|---|---|---|
| 7,733,903 B2 | 6/2010 | Bhogal et al. | |
| 7,774,202 B2 * | 8/2010 | Spengler | G10L 15/22 |
| | | | 704/241 |
| 8,032,267 B1 * | 10/2011 | Simon | G01C 23/005 |
| | | | 701/4 |
| 8,234,121 B1 | 7/2012 | Swearingen | |
| 8,793,139 B1 | 7/2014 | Serban et al. | |
| 9,443,433 B1 | 9/2016 | Conway et al. | |
| 9,530,318 B1 | 12/2016 | Turner et al. | |
| 9,550,578 B2 * | 1/2017 | McCullough | G10L 15/26 |
| 9,665,645 B2 | 5/2017 | Hawley | |
| 9,666,178 B2 | 5/2017 | Loubiere et al. | |
| 9,830,829 B1 | 11/2017 | Doyen et al. | |
| 9,830,910 B1 * | 11/2017 | Shapiro | G08G 5/21 |
| 9,922,651 B1 | 3/2018 | Nelson et al. | |
| 10,056,085 B2 | 8/2018 | Klose et al. | |
| 10,204,430 B2 | 2/2019 | Gowda | |
| 10,403,274 B2 | 9/2019 | Girod et al. | |
| 10,490,085 B2 | 11/2019 | Cotdeloup et al. | |
| 10,535,351 B2 | 1/2020 | Gaston et al. | |
| 10,705,794 B2 * | 7/2020 | Gruber | G10L 15/22 |
| 10,847,145 B2 * | 11/2020 | Lafon | G10L 15/00 |
| 11,893,992 B2 * | 2/2024 | Piernot | G10L 15/22 |
| 2003/0093187 A1 * | 5/2003 | Walker | B64D 45/0059 |
| | | | 701/1 |
| 2008/0140306 A1 | 6/2008 | Snodgrass et al. | |
| 2008/0201148 A1 | 8/2008 | Desrochers | |
| 2010/0100310 A1 * | 4/2010 | Eich | G08G 1/096861 |
| | | | 701/533 |
| 2011/0173002 A1 * | 7/2011 | Fujii | G10L 15/26 |
| | | | 704/E15.001 |
| 2011/0184730 A1 | 7/2011 | Lebeau et al. | |
| 2012/0010887 A1 | 1/2012 | Boregowda et al. | |
| 2012/0078448 A1 | 3/2012 | Dorneich et al. | |
| 2015/0081138 A1 | 3/2015 | Lacko et al. | |
| 2015/0199636 A1 * | 7/2015 | Gil | G06Q 50/40 |
| | | | 705/7.39 |
| 2015/0212671 A1 | 7/2015 | Judy et al. | |
| 2015/0212701 A1 | 7/2015 | Rodney et al. | |
| 2015/0217870 A1 | 8/2015 | McCullough et al. | |
| 2015/0378671 A1 | 12/2015 | Grobauer et al. | |
| 2017/0263248 A1 | 9/2017 | Gruber et al. | |
| 2018/0061243 A1 * | 3/2018 | Shloosh | G08G 5/21 |
| 2020/0027445 A1 | 1/2020 | Raghunathan et al. | |
| 2020/0152188 A1 | 5/2020 | Lee | |
| 2020/0322040 A1 | 10/2020 | Middlestead et al. | |
| 2020/0372916 A1 | 11/2020 | Delpech | |
| 2021/0216275 A1 | 7/2021 | Iwasaki | |
| 2021/0295840 A1 | 9/2021 | John et al. | |
| 2021/0334068 A1 * | 10/2021 | Rangaraju | G06F 3/04817 |
| 2022/0049973 A1 * | 2/2022 | Quint | G01C 21/3694 |
| 2022/0194576 A1 * | 6/2022 | Yang | G08G 5/21 |

FOREIGN PATENT DOCUMENTS

| | | |
|---|---|---|
| DE | 102009025530 A1 | 12/2010 |
| EP | 2026328 A1 | 2/2009 |
| EP | 2278581 B1 | 8/2012 |
| EP | 3664065 A1 | 6/2020 |
| EP | 3889947 A1 | 10/2021 |
| FR | 3009759 B1 | 2/2015 |
| FR | 3032574 A1 | 8/2016 |
| FR | 3032575 A1 | 8/2016 |

* cited by examiner

400

500

600

CONTEXTUAL EDITABLE SPEECH RECOGNITION METHODS AND SYSTEMS

CROSS REFERENCE TO RELATED APPLICATION

This application claims priority to India Provisional Patent Application No. 202211000590, filed Jan. 5, 2022, the entire content of which is incorporated by reference herein.

TECHNICAL FIELD

The subject matter described herein relates generally to vehicle systems, and more particularly, embodiments of the subject matter relate to contextual speech recognition for interfacing with aircraft systems and related cockpit displays.

BACKGROUND

Modern flight deck displays (or cockpit displays) are utilized to provide a number of different displays from which a pilot or other user can obtain information or perform functions related to, for example, navigation, flight planning, guidance and navigation, and performance management. Modern displays also allow a pilot to input commands or other information to onboard systems, such as, navigational clearances or commands issued by an air traffic controller (ATC). For example, air traffic control typically involves voice communications between air traffic control and a pilot or crewmember onboard the various aircrafts within a controlled airspace, where the ATC may communicate an instruction or a request for pilot action by a particular aircraft using a call sign assigned to that aircraft. However, input of an incomplete and/or incorrect clearance or other command by a pilot can be consequential and antithetical to maintaining aircraft control. Accordingly, it is desirable to provide aircraft systems and methods that facilitate inputting ATC clearances or other commands with improved accuracy. Other desirable features and characteristics of the methods and systems will become apparent from the subsequent detailed description and the appended claims, taken in conjunction with the accompanying drawings and the preceding background.

BRIEF SUMMARY

Methods and systems are provided for assisting operation of a vehicle, such as an aircraft, using speech recognition. One method involves recognizing an audio input as an input voice command including a commanded value for an operational subject associated with the input voice command, automatically identifying an expected value for the operational subject that is different from the commanded value, providing a graphical representation of the input voice command on a graphical user interface (GUI) display, providing a selectable GUI element associated with the expected value for the operational subject on the GUI display, and after selection of the selectable GUI element, commanding a destination system associated with the vehicle to execute a command corresponding to the input voice command using the expected value for the operational subject.

In another embodiment, a computer-readable medium having computer-executable instructions stored thereon is provided. The computer-executable instructions, when executed by a processing system, cause the processing system to recognize an audio input as an input voice command comprising a commanded value for an operational subject, automatically identify an alternative value different from the commanded value for the operational subject, provide a graphical representation of the input voice command on a GUI display, provide a selectable GUI element associated with the alternative value for the operational subject on the GUI display, and command a destination system to execute the input voice command using the alternative value for the operational subject in response to selection of the selectable GUI element.

In another embodiment, a voice command recognition system is provided that includes a system to provide information indicative of a current operational context for a vehicle, an audio input device receive input voice command audio, and a processing system coupled to the system and the audio input device to recognize the input voice command audio as an input voice command including a commanded value for an operational subject associated with the input voice command, automatically identify an expected value for the operational subject based at least in part on the current operational context, wherein the expected value is different from the commanded value, provide a graphical representation of the input voice command on a GUI display, provide a selectable GUI element associated with the expected value for the operational subject on the GUI display, and after selection of the selectable GUI element, command a destination system associated with the vehicle to execute a command corresponding to the input voice command using the expected value for the operational subject.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
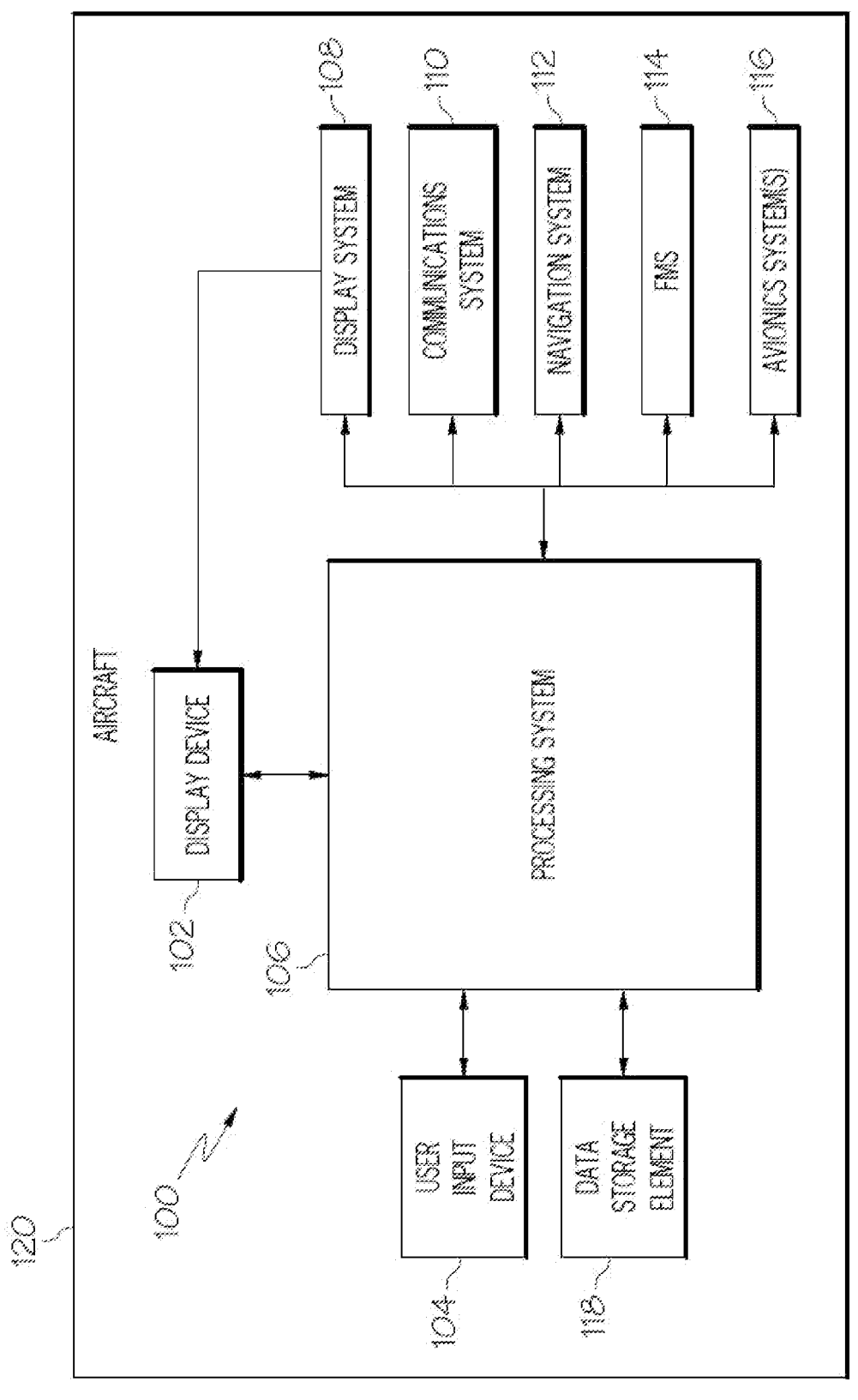
FIG. 1 is a block diagram illustrating a system suitable for use with a vehicle such as an aircraft in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein generally relate to systems and methods that facilitate a vehicle operator providing an audio input to one or more displays or onboard systems using a speech recognition. For purposes of explanation, the subject matter is primarily described herein in the context of aircraft operating in a controlled airspace; however, the subject matter described herein is not necessarily limited to aircraft or avionic environments, and in alternative embodiments, may be implemented in an equivalent manner for ground operations, marine operations, or otherwise in the context of other types of vehicles and travel spaces.

As described in greater detail below primarily in the context of FIGS. 2-6, an input voice command is parsed and analyzed to automatically identify an operational subject or entity that is specified within the voice command, which, in turn, is utilized to automatically identify different potential parameter values capable of being defined, assigned, or otherwise associated with the operational subject based on the current operational context. For example, natural language processing or similar artificial intelligence (AI) techniques may be applied to an voice command (or a transcription or textual representation thereof) to ascertain the intent of a respective voice command and identify the operational subject or entity to which the respective voice command pertains, such as, a runway, a taxiway, a waypoint, a heading, an altitude, a flight level, a communications radio or another avionics system or setting, an aircraft action (e.g., landing, takeoff, pushback, hold, or the like) and/or the like. After identifying the operational subject of the voice command, the current operational context is utilized to determine different potential parameter values for that operational subject given the current operational context. In this regard, the different potential parameter values represent different alternatives for the operational subject, and may include one or more expected parameter values given the current operational context as well as additional alternative values that are viable, feasible, logical or otherwise consistent with the current operational context. For example, the current location of the aircraft with respect to a taxi clearance, a flight plan, or other defined route or manner of operation of the aircraft may be utilized to identify the expected or alternative values for the operational subject for the received voice command (e.g., the next taxiway of the taxi clearance, the runway specified by the taxi clearance or the flight plan, the assigned gate for the aircraft, and/or the like).

Additionally, or alternatively, in some embodiments, the expected parameter values or other different potential alternative values for a received voice command may be determined or otherwise derived from analysis of the current conversational context and/or preceding clearance communications, for example, by querying a database or other data storage element for one or more potential parameter values for the operational subject relevant to the current operational context based on a transcription of preceding ATC clearance communications (e.g., by identifying a preceding ATC clearance communication that specifies a particular parameter value for the operational subject), or by predicting one or more potential parameter values for the operational subject based on preceding ATC clearance communications using the current operational context and/or other real-time data (e.g., data derived from current or recent flight traffic and/or the flight paths associated therewith).

Figure 4:
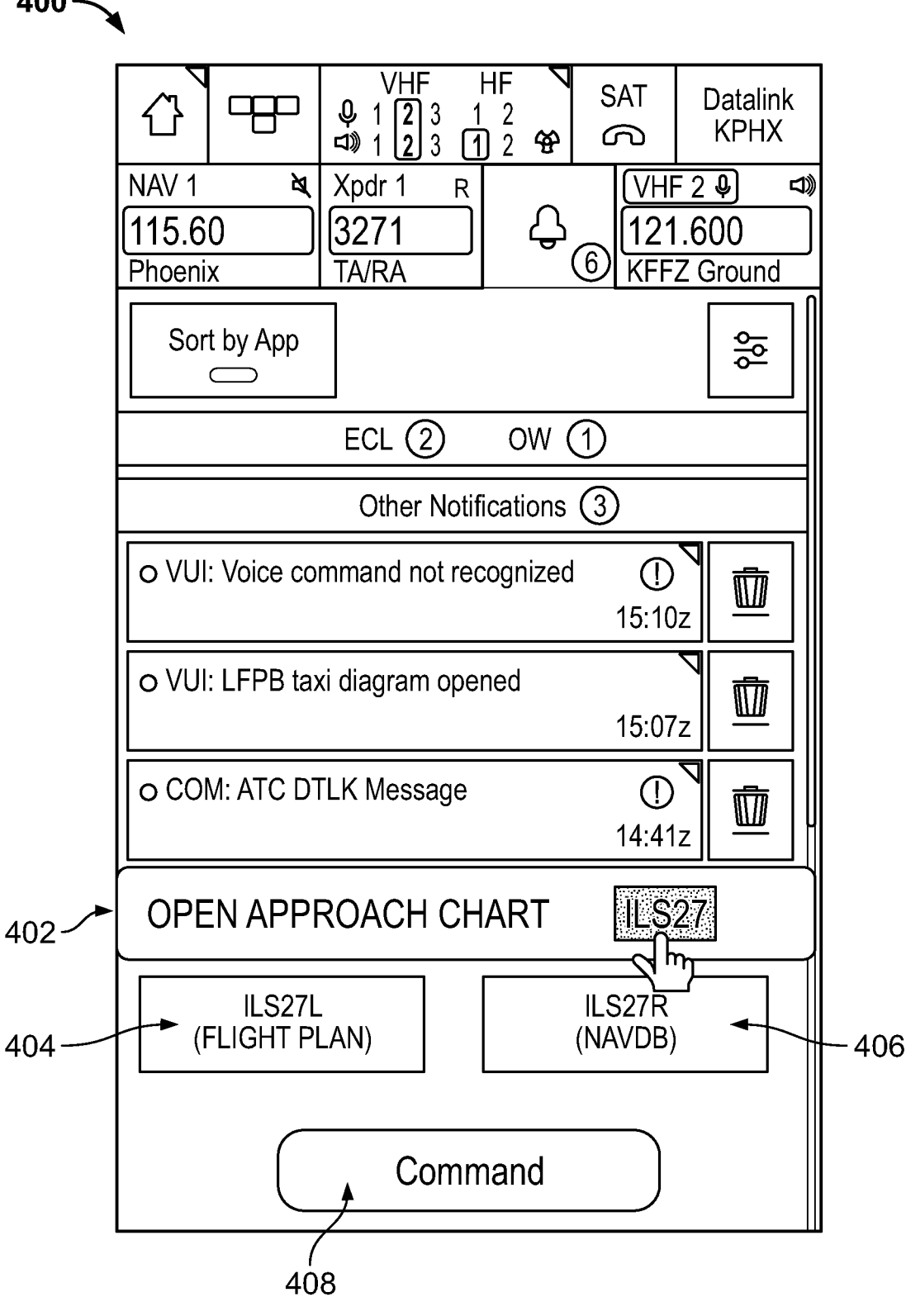
FIGS. 4-6 depict exemplary graphical user interface (GUI) displays suitable for presentation on a display device onboard an aircraft in connection with the contextual editing process of FIG. 3 in one or more exemplary embodiments.
Figure 5:
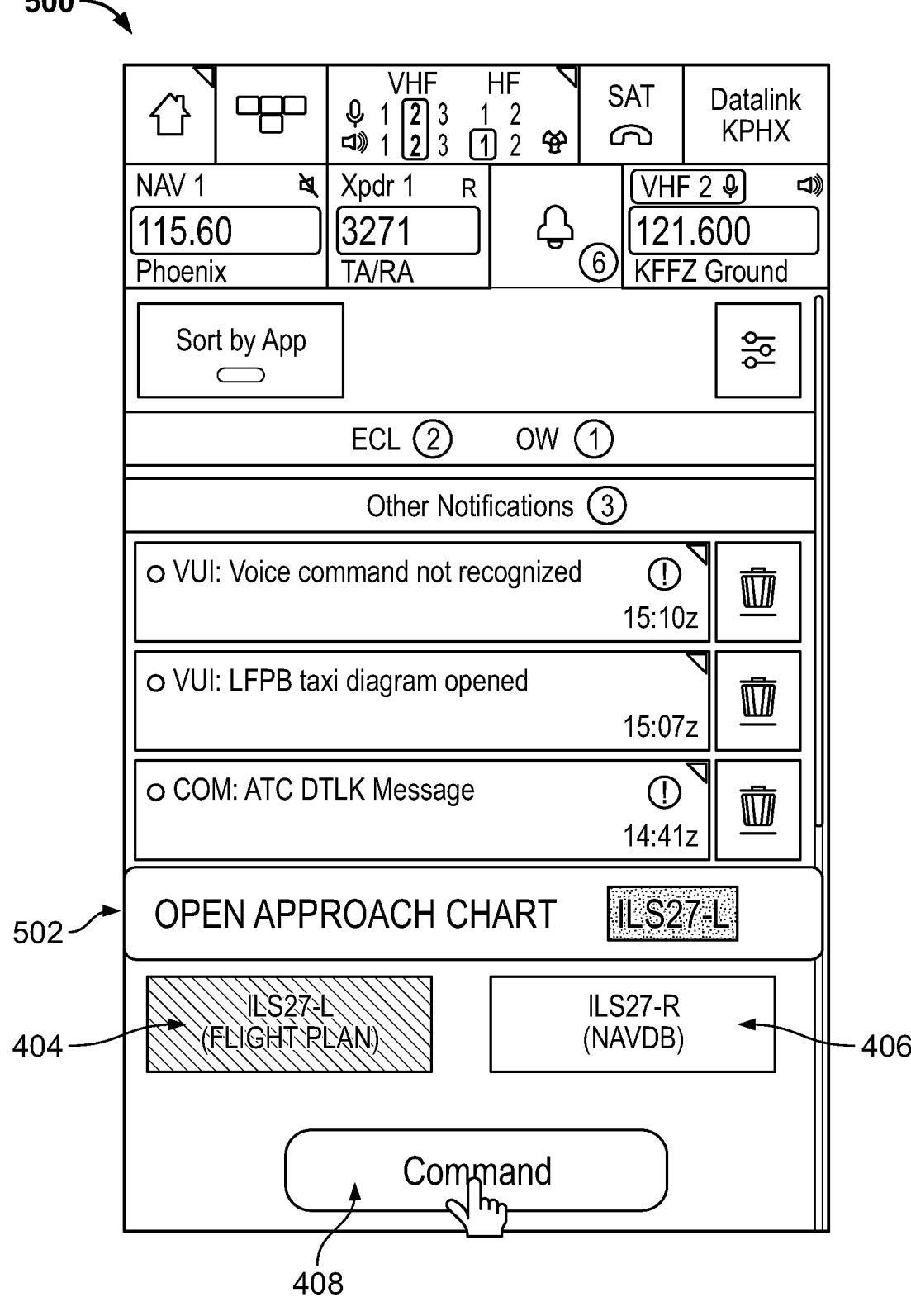
Figure 6:
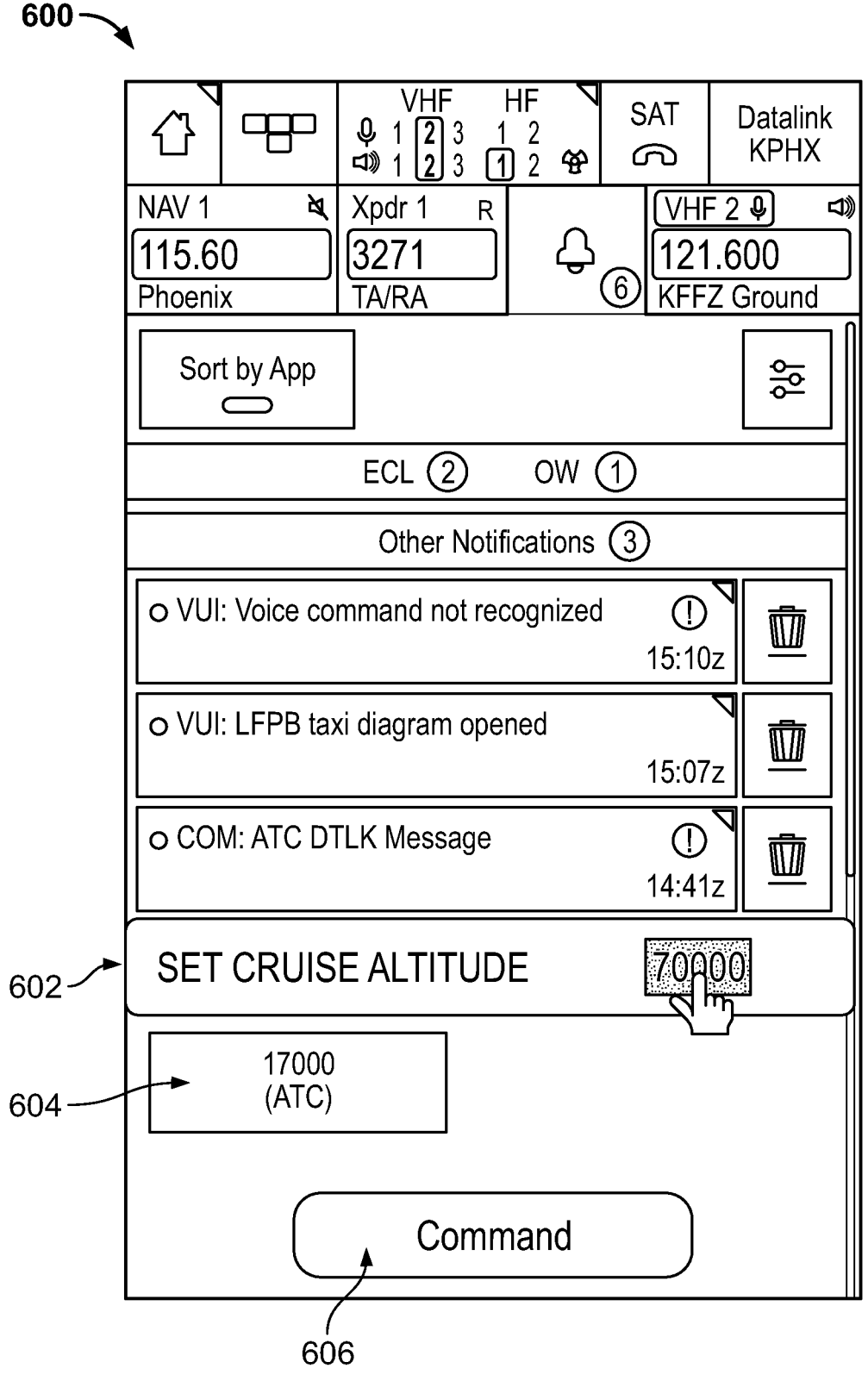

As depicted in FIGS. 4-6, in exemplary embodiments, a graphical representation of the received input voice command including the recognized value for the operational subject is provided on a graphical user interface (GUI) display along with one or more selectable GUI elements associated with the different potential parameter values that were identified for the operational subject of the input voice command A pilot or other user may utilize the GUI display to verify or otherwise confirm that the correct input voice command was accurately received when the recognized command value for the operational subject on the display matches the user's desired command value for the operational subject. In this regard, when the displayed recognized command value for the operational subject of the input voice command does not reflect the value intended to be input by the pilot, the pilot may utilize a selectable GUI element on the GUI display to augment or otherwise modify the received voice command to include the expected value or other alternate value in lieu of the recognized parameter value with minimal additional workload (e.g., the pilot does not need to repeat the voice command) In response to selection of the selectable GUI element to modify the command value for the operational subject of the voice command, the corresponding command(s), instruction(s) and/or signal(s) for implementing the voice command are automatically output or otherwise provided to the appropriate destination onboard system(s) for automated execution of the voice command using the substituted command value for the operational subject. Thus, the pilot may utilize the GUI display with the selectable GUI elements for different contextually-relevant alternate parameter values to quickly edit the voice command without delays or potential errors that could otherwise be associated with requiring the pilot to repeat the voice command or manually input the desired parameter value. Additionally, the selected command value may be utilized in concert with the received audio for the input voice command to update or otherwise train one or more speech recognition model(s) to improve future recognition accuracy, as described in greater detail below.

FIG. 1 depicts an exemplary embodiment of a system 100 which may be utilized with a vehicle, such as an aircraft 120. In an exemplary embodiment, the system 100 includes, without limitation, a display device 102, one or more user input devices 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, and the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some exemplary embodiments, the user input device 104 includes or is realized as an audio input device, such as a microphone, audio transducer, audio sensor, or the like, that is adapted to allow a user to provide audio input to the system 100 in a "hands free" manner using speech recognition.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

In the illustrated embodiment, the aircraft system 100 includes a data storage element 118, which contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof. As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. An airport should be understood as referring to any sort of location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. An airport may have one or more predefined aircraft procedures associated therewith, wherein the aircraft procedure information for each aircraft procedure at each respective airport are maintained by the data storage element 118 in association with one another.

Depending on the embodiment, the aircraft procedure information may be provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VORTACs, TACANs, and the like), distance measuring equipment, non-directional beacons, or the like) defining the aircraft procedure, such as, for example, altitude minima or maxima, minimum and/or maximum speed constraints, RTA constraints, and the like. In this regard, although the subject matter may be described in the context of a particular procedure for purpose of explanation, the subject matter is not intended to be limited to use with any particular type of aircraft procedure and may be implemented for other aircraft procedures in an equivalent manner.

Still referring to FIG. 1, in exemplary embodiments, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system.

In exemplary embodiments, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
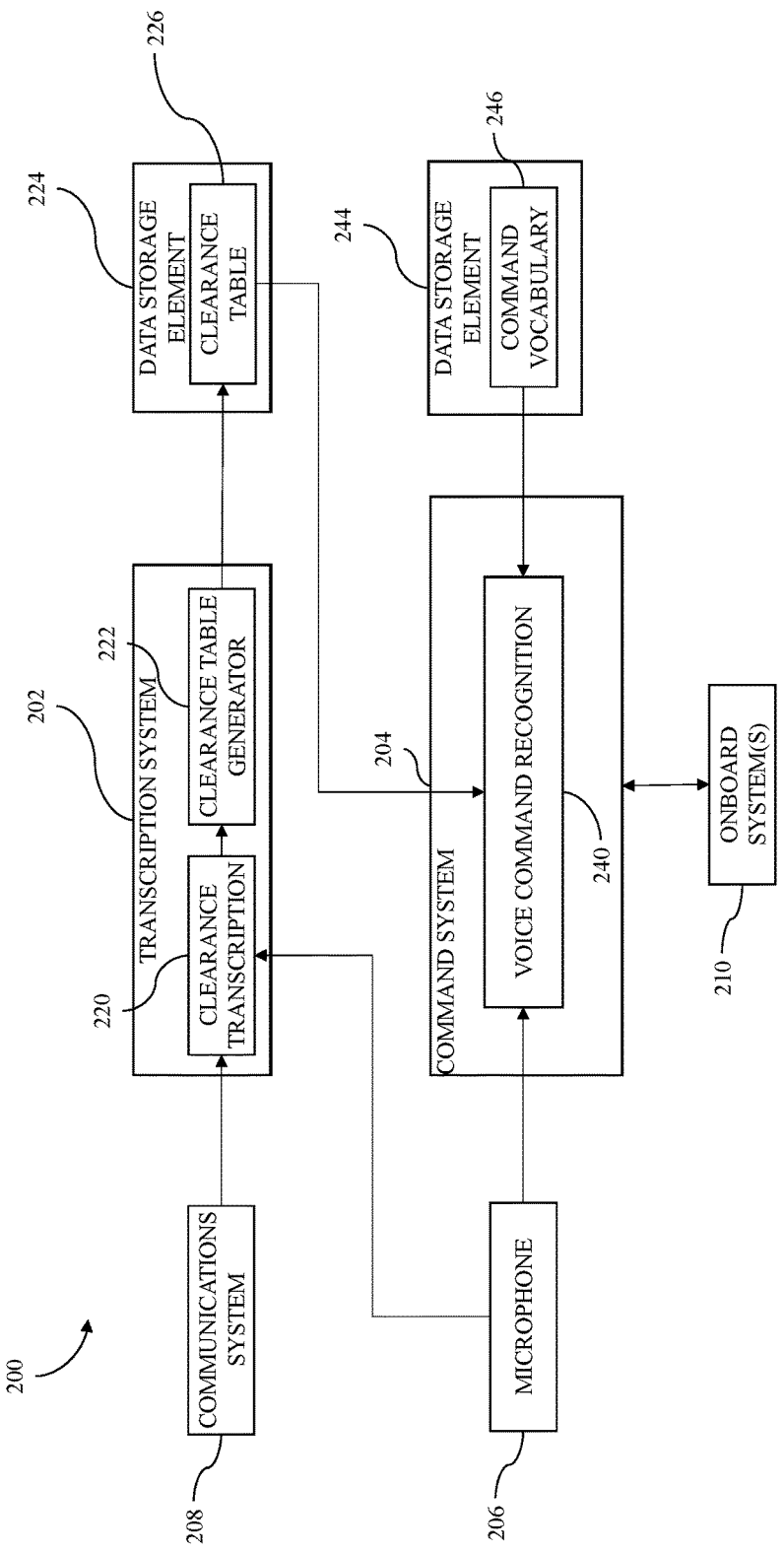
FIG. 2 is a block diagram illustrating a speech recognition system suitable for use with the aircraft system of FIG. 1 in accordance with one or more exemplary embodiments.

FIG. 2 depicts an exemplary embodiment of a speech recognition system 200 for recognizing speech or voice commands that supports contextual editing using the current operational context including preceding audio communications. In one or more exemplary embodiments, the speech recognition system 200 is implemented or otherwise provided onboard a vehicle, such as aircraft 120; however, in alternative embodiments, the speech recognition system 200 may be implemented independent of any aircraft or vehicle, for example, at a ground location such as an air traffic control facility. That said, for purposes of explanation, the speech recognition system 200 may be primarily described herein in the context of an implementation onboard an aircraft. The illustrated speech recognition system 200 includes a transcription system 202, a command system 204, an audio input device 206 (or microphone) and one or more communications systems 208 (e.g., communications system 110). The output of the command system 204 is coupled to one or more onboard systems 210 (e.g., one or more avionics systems 108, 110, 112, 114, 116) to provide control signals or other indicia of a recognized control command or user input to the desired destination onboard system 210 (e.g., via an avionics bus or other communications medium) of the voice command for implementation or execution. It should be understood that FIG. 2 is a simplified representation of the speech recognition system 200 for purposes of explanation and ease of description, and FIG. 2 is not intended to limit the application or scope of the subject matter described herein in any way.

The transcription system 202 generally represents the processing system or component of the speech recognition system 200 that is coupled to the microphone 206 and communications system(s) 208 to receive or otherwise obtain clearance communications, analyze the audio content of the clearance communications, and transcribe the clearance communications, as described in greater detail below. The command system 204 generally represents the processing system or component of the speech recognition system 200 that is coupled to the microphone 206 to receive or otherwise obtain voice commands, analyze the audio content of the voice commands, and output control signals to an appropriate onboard system 210 to effectuate the voice command, as described in greater detail below. In some embodiments, the transcription system 202 and the command system 204 are implemented separately using distinct hardware components, while in other embodiments, the features and/or functionality of the transcription system 202 and the command system 204 maybe integrated and implemented using a common processing system (e.g., processing system 106). In this regard, the transcription system 202 and the command system 204 may be implemented using any sort of hardware, firmware, circuitry and/or logic components or combination thereof. In one or more exemplary embodiments, the transcription system 202 and the command system 204 are implemented as parts of the processing system 106 onboard the aircraft 120 of FIG. 1.

The audio input device 206 generally represents any sort of microphone, audio transducer, audio sensor, or the like capable of receiving voice or speech input. In this regard, in one or more embodiments, the audio input device 206 is realized as a microphone (e.g., use input device 104) onboard the aircraft 120 to receive voice or speech annunciated by a pilot or other crewmember onboard the aircraft 120 inside the cockpit of the aircraft 120. The communications system(s) 208 (e.g., communications system 110) generally represent the avionics systems capable of receiving clearance communications from other external sources, such as, for example, other aircraft, an air traffic controller, or the like. Depending on the embodiment, the communications system(s) 208 could include one or more of a very high frequency (VHF) radio communications system, a controller-pilot data link communications (CPDLC) system, an aeronautical operational control (AOC) communications system, an aircraft communications addressing and reporting system (ACARS), and/or the like.

In exemplary embodiments, computer-executable programming instructions are executed by the processor, control module, or other hardware associated with the transcription system 202 and cause the transcription system 202 to generate, execute, or otherwise implement a clearance transcription application 220 capable of analyzing, parsing, or otherwise processing voice, speech, or other audio input received by the transcription system 202 to convert the received audio into a corresponding textual representation. In this regard, the clearance transcription application 220 may implement or otherwise support a speech recognition engine (or voice recognition engine) or other speech-to-text system. Accordingly, the transcription system 202 may also include various filters, analog-to-digital converters (ADCs), or the like, and the transcription system 202 may include or otherwise access a data storage element 224 (or memory) that stores a speech recognition vocabulary for use by the clearance transcription application 220 in converting audio inputs into transcribed textual representations. In one or more embodiments, the clearance transcription application 220 may also mark, tag, or otherwise associate a transcribed textual representation of a clearance communication with an identifier or other indicia of the source of the clearance communication (e.g., the onboard microphone 206, a radio communications system 208, or the like).

In exemplary embodiments, the computer-executable programming instructions executed by the transcription system 202 also cause the transcription system 202 to generate, execute, or otherwise implement a clearance table generation application 222 (or clearance table generator) that receives the transcribed textual clearance communications from the clearance transcription application 220 or receives clearance communications in textual form directly from a communications system 208 (e.g., a CPDLC system). The clearance table generator 222 parses or otherwise analyzes the textual representation of the received clearance communications and generates corresponding clearance communication entries in a table 226 in the memory 224. In this regard, the clearance table 226 maintains all of the clearance communications received by the transcription system 202 from either the onboard microphone 206 or an onboard communications system 208. In exemplary embodiments, the clearance transcription application 220 continually transcribes audio content of clearance communications received at the aircraft into corresponding textual representations, which, in turn, are then parsed and analyzed by the clearance table generation application 222 to identify the operational subjects and parameters specified within the received sequence of clearance communications pertaining to the aircraft. For example, natural language processing may be applied to the textual representations of the clearance communications that were directed to the ownship aircraft by ATC, provided by the ownship aircraft to ATC, broadcasted by ATIC or otherwise received from ATIS to identify the operational subject(s) of the clearance communications and any operational parameter value(s) and/or aircraft action(s) associated with the clearance communications, which are then stored or otherwise maintained in association with the transcribed audio content of the received audio communication in the clearance table 226. For each entry in the clearance table 226, the clearance table generation application 222 may utilize natural language processing, machine learning or artificial intelligence (AI) techniques to perform semantic analysis (e.g., parts of speech tagging, position tagging, and/or the like) on the transcribed audio communication to identify the operational objective of the communication, the operational subject(s), operational parameter(s) and/or action(s) contained within the communication based on the syntax of the respective communication.

In exemplary embodiments, for each clearance communication received by the clearance table generator 222, the clearance table generator 222 parses or otherwise analyzes the textual content of the clearance communication using natural language processing and attempts to extract or otherwise identify, if present, one or more of an identifier contained within the clearance communication (e.g., a flight identifier, call sign, or the like), an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), and/or an action associated with the clearance communication (e.g., landing, takeoff, pushback, hold, or the like). The clearance table generator 222 also identifies the radio frequency or communications channel associated with the clearance communication and attempts to identify or otherwise determine the source of the clearance communication. The clearance table generator 222 then creates or otherwise generates an entry in the clearance table 226 that maintains an association between the textual content of the clearance communication and the identified fields associated with the clearance communication. Additionally, the clearance table generator 222 may analyze the new clearance communication entry relative to existing clearance communication entries in the clearance table 226 to identify or otherwise determine a conversational context to be assigned to the new clearance communication entry.

Still referring to FIG. 2, the processor, control module, or other hardware associated with the command system 204 executes computer-executable programming instructions that cause the command system 204 to generate, execute, or otherwise implement a voice command recognition application 240 capable of analyzing, parsing, or otherwise processing voice, speech, or other audio user input received by the command system 204 via the microphone 206 to convert the received audio into a corresponding command intended for a particular destination output system 210. In this regard, voice command recognition application 240 implements or otherwise supports a speech recognition engine (or voice recognition engine) or other speech-to-text system. In exemplary embodiments, the recognition engine implemented by the voice command recognition application 240 is realized using a two-stage probabilistic recognition scheme that includes an acoustic model and a language model realized as a finite state directed graph data structure, where the acoustic scores from the acoustic model are utilized to compute probabilities for the different paths (or sequences of nodes and edges) of the finite state graph data structure, with the highest probability path being recognized as the desired command input by the user, for which corresponding control signals may then be output by the voice command recognition application 240 to the appropriate onboard system 210 for implementing or executing the recognized command.

In exemplary embodiments, the processor, control module, or other hardware associated with the command system 204 executes computer-executable programming instructions that cause the command system 204 to generate or otherwise construct a recognition graph data structure from a command vocabulary 246, where a path (or sequence of nodes and edges) of the recognition graph data structure corresponds to a particular voice command to be implemented by or at an onboard system 210. In some embodiments, after a received voice command audio is probabilistically mapped or recognized to a particular path of the recognition graph data structure that has the highest probability of matching the voice command audio, the voice command recognition application 240 generates or otherwise provides a graphical representation of the recognized voice command corresponding to the highest probability path in the recognition graph data structure.

As described in greater detail below in the context of FIGS. 3-6, in exemplary embodiments, the voice command recognition application 240 analyzes the recognized voice command to identify the operational subject of the voice command and the recognized command value pertaining to that operational subject. The voice command recognition application 240 obtains information indicative of the current operational context from the clearance table 226 (e.g., the current conversational context) and/or one or more onboard systems 210 (e.g., the current geographic location, the current aircraft altitude, the current aircraft configuration, the current aircraft action, and/or the like) and automatically identifies one or more alternative values for the operational subject of the recognized voice command that are different from the recognized command value for the operational subject. In this regard, the voice command recognition application 240 attempts to identify alternative values for the operational subject of the recognized voice command that could potentially be viable or feasible given the current state of the aircraft (e.g., the current geographic location, altitude, configuration, fuel remaining, etc.), or would otherwise be logical or consistent with the current operational context (e.g., consistent with the flight plan, preceding ATC commands or clearance communications with respect to the aircraft, and/or the like). For each alternative value identified for the operational subject, the generates or otherwise provides a graphical representation of the alternative value in connection with a button or similar selectable GUI element that is manipulable by the pilot or other user to augment the recognized voice command by substituting the alternative value for the previously recognized command value for the operational subject.

In one or more embodiments, the potential alternative value for the operational subject is determined or otherwise derived from analysis of the current conversational context and/or preceding clearance communications maintained in the clearance table 226. In this regard, the voice command recognition application 240 may search or query the clearance table 226 to identify one or more preceding ATC clearance communications associated with the ownship aircraft (e.g., ATC commands or other instructions provided by the ATC to the ownship aircraft or ATC clearance communications provided by the pilot or other user to the ATC) that include the identified operational subject, and then identify the specified value for the identified operational subject in a preceding ATC clearance communication as a potential alternative value. For example, the voice command recognition application 240 may query the clearance table 226 to identify a previously-assigned value for the identified operational subject that was specified as part of an ATC command for the ownship aircraft in a preceding ATC clearance communication received from the ATC as a potential alternative value for the identified operational subject when the recognized command value for the operational subject does not match or is otherwise different from the assigned value contained in a preceding ATC command for the ownship aircraft. In this manner, the voice command recognition application 240 may identify an alternative value that is logically consistent with the current conversational context and preceding ATC communications that may have been intended for entry by the pilot in connection with the voice command.

Similarly, in some embodiments, the voice command recognition application 240 may determine or otherwise derive a potential alternative value by searching or querying one or more databases or other data storage elements onboard the aircraft for potential alternative values for the operational subject that are likely to be relevant to the current operational context of the aircraft at the time of receipt of the respective voice command (e.g., the current flight phase, the current airspace or geographic region of operation, the current aircraft configuration, the current aircraft altitude, and/or the like). For example, based on the currently active flight plan, the current flight phase of the aircraft, the current aircraft procedure being flown, the current aircraft action, the current aircraft configuration, the current geographic location of the aircraft and/or the like, the voice command recognition application 240 may search or otherwise query an aircraft procedure database to identify an alternative value for operational subject of the voice command that is consistent with the current flight phase, the current aircraft configuration and/or the like that is also associated with the current aircraft procedure being flown, an upcoming waypoint, procedure, route or airport associated with the currently active flight plan, or is otherwise within a threshold distance or altitude of the current geographic location of the aircraft, the current aircraft altitude, and/or the like. It should be appreciated that there are numerous different manners in which a potential alternative value for the current operational context may be identified based on data stored or otherwise maintained in a database or other data storage element, and the subject matter described herein is not limited to any particular implementation. For example, if the voice command includes keywords that indicate a specific action or item from a checklist or a standard operating procedure, the voice command recognition application 240 may search, query or otherwise reference that checklist or standard operating procedure that is invoked by the voice command to identify a potential alternative value from that respective checklist or standard operating procedure.

In addition to potential alternative values identified based on the current operational context, the voice command recognition application 240 may determine or otherwise derive a potential alternative value from a next highest probability path in the recognition path data structure and/or the next highest probability value for the operational subject within the voice command. For example, the voice command recognition application 240 may identify the second highest probability value for the identified operational subject as a potential alternative value for use in lieu of the previously recognized commanded value for the identified operational subject that was identified as having the highest probability value. Thus, the voice command recognition application 240 may effectively provide a menu of alternative values that include both contextually-relevant alternatives as well as acoustically-similar alternatives for potential substitution.

In response to user selection of a selectable GUI element associated with an alternative value for the operational subject of the recognized voice command, the voice command recognition application 240 augments or otherwise modifies the recognized voice command to include the selected alternative value for the operational subject in lieu of the originally-recognized value for the operational subject based on the received voice command audio. Thereafter, the voice command recognition application 240 outputs, generates or otherwise provides commands or signals corresponding to the augmented voice command to one or more destination onboard systems 210 for that voice command. In this regard, rather than utilizing the originally recognized value for the operational subject, the voice command recognition application 240 allows the pilot or other user to quickly and easily substitute the desired value before providing the corresponding command(s), signal(s) or other instruction(s) to the destination onboard system(s) 210 for implementation and/or execution. In one or more exemplary embodiments, the selected alternative value is also stored or otherwise maintained in association with the received voice command audio, which, in turn, may be utilized to adaptively train (or retrain) and dynamically update the acoustic model utilized by the voice command recognition application 240, as described in greater detail below.

Figure 3:
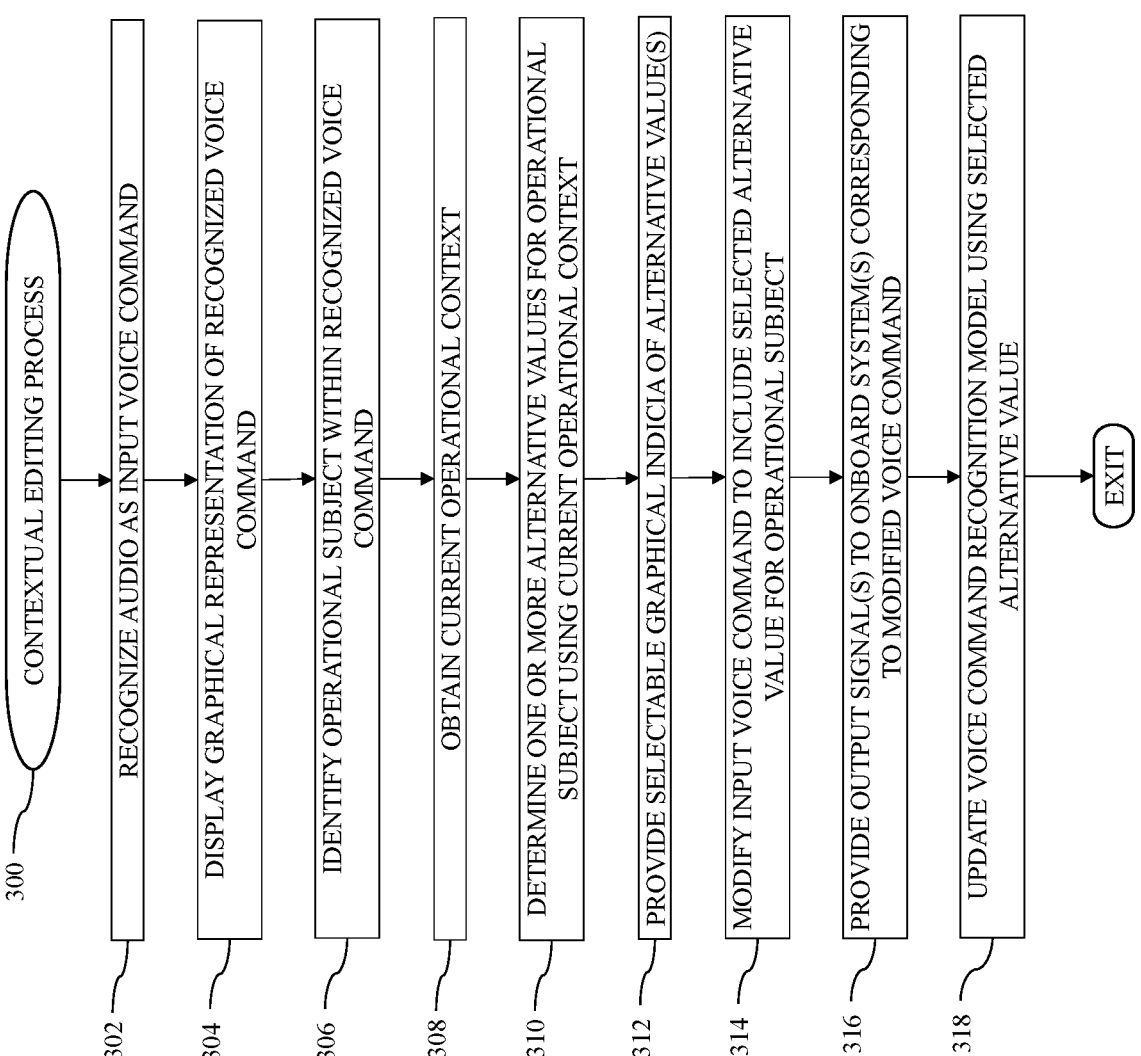
FIG. 3 is a flow diagram of a contextual editing process suitable for implementation by the contextual speech recognition system of FIG. 2 in the aircraft system of FIG. 1 in one or more exemplary embodiments.

FIG. 3 depicts an exemplary embodiment of a contextual editing process 300 suitable for implementation by an aircraft system to facilitate editing a recognized voice command using the current operational context to identify one or more alternative values. The various tasks performed in connection with the illustrated process may be implemented using hardware, firmware, software executed by processing circuitry, or any combination thereof. For illustrative purposes, the following description may refer to elements mentioned above in connection with FIGS. 1-2. In practice, portions of the contextual editing process 300 may be performed by different elements of the aircraft system 100. That said, exemplary embodiments are described herein in the context of the contextual editing process 300 being primarily performed by the processing system 106 implementing a speech recognition system 200. It should be appreciated that the contextual editing process 300 may include any number of additional or alternative tasks, the tasks need not be performed in the illustrated order and/or the tasks may be performed concurrently, and/or the contextual editing process 300 may be incorporated into a more comprehensive procedure or process having additional functionality not described in detail herein. Moreover, one or more of the tasks shown and described in the context of FIG. 3 could be omitted from a practical embodiment of the contextual editing process 300 as long as the intended overall functionality remains intact.

Referring to FIG. 3 with continued reference to FIGS. 1-2, the illustrated embodiment of the contextual editing process 300 initializes or otherwise begins by recognizing received speech audio from a user as a particular voice command to be input or otherwise initiated by the user and displaying or otherwise providing a graphical representation of the recognized voice command (tasks 302, 304). For example, when a pilot or other user onboard the aircraft 120 manipulates the user input device 104 to indicate a desire to provide a voice command or otherwise initiate provisioning a voice command, the command system 204 and/or the voice command recognition application 240 resolves or otherwise recognizes the voice command audio subsequently received via the microphone 206 to a particular path of the recognition graph data structure (e.g., by using an acoustic model to assign scores or probabilities to different paths of the graph data structure and identify the highest probability path). In this manner, the voice command audio is probabilistically mapped or recognized to a particular path of the recognition graph data structure having the highest probability of matching the voice command audio, and thereby effectively converted from speech audio to a corresponding textual representation (e.g., speech-to-text recognition) that includes the sequence of nodes for the highest probability path. The voice command recognition application 240 generates or otherwise provides a graphical representation of the textual representation of the recognized voice command audio on the display device 102 onboard the aircraft 120, thereby allowing the pilot or other user to view and assess the input voice command as it was recognized and received by the onboard recognition system 106, 200.

The contextual editing process 300 continues by detecting or otherwise identifying an operational subject within the recognized voice command for potential editing (task 306). In some embodiments, the operational subject is identified in response to a user manually selecting or otherwise identifying an operational subject for editing. In this regard, a pilot may manipulate a user input device 104 to select or otherwise indicate a portion of the displayed graphical representation of the recognized voice command that he or she would like to modify. For example, for a recognized voice command of "HOLD AT WAYPOINT AFRIC," the pilot may select the recognized command value of "AFRIC" to indicate a desire to change the waypoint identifier value. In other embodiments, the operational subject is automatically identified within the recognized voice command, for example, by using natural language processing and/or other artificial intelligence techniques. For example, the voice command recognition application 240 may scan or otherwise analyze the content of the recognized voice command to identify a keywords or placeholder within the recognized voice command that is associated with a particular operational subject or is otherwise capable of being assigned a parameter value in connection with the voice command. In one embodiment, the voice command recognition application 240 utilizes parts-of-speech tagging and a template-based pattern matching approach (or template matching) is utilized to identify sets of keywords or key values that may be utilized to establish mappings using the format or syntax of commands supported by the command vocabulary. For example, for the recognized voice command of "HOLD AT WAYPOINT AFRIC," natural language processing may identify the intent of the command is to hold at waypoint AFRIC, where the word "HOLD" is tagged or matched to the action word in the command, "WAYPOINT" is tagged or matched to the operational subject of the command (e.g., the place where the hold action applies), and "AFRIC" is tagged or matched to the operational parameter value (e.g., the waypoint identifier) for the operational subject of the command (e.g., the name of the place where the hold action applies). In this manner, the operational subject of the recognized voice command may be identified as a waypoint, where the value "AFRIC" is identified as the recognized command value capable of being edited or modified for the waypoint that is the operational subject of the hold command.

After identifying the operational subject for potential modification, the contextual editing process 300 continues by identifying or otherwise obtaining data or information indicative of the current operational context for the aircraft and determining one or more alternative values for the identified operational subject that are different from the initially-recognized command value using the current operational context (tasks 308, 310). In this regard, the command system 204 and/or the voice command recognition application 240 receives indicia of the current operational context for the aircraft (e.g., the current location of the aircraft with respect to a taxi clearance, a flight plan, or other defined route or manner of operation of the aircraft, the current flight phase, the current geographic location of the aircraft, the current altitude of the aircraft, the current physical configuration of the aircraft, and/or the like) from one or more onboard system(s) 208 in addition to retrieving or otherwise obtaining the current conversational context associated with the aircraft (e.g., the subset of ATC clearance communications directed to and/or sent from the ownship aircraft) from the clearance table 226. Thereafter, the command system 204 and/or the voice command recognition application 240 utilized the current operational context to identify or otherwise determine one or more potential alternative values for the identified operational subject that are different from the initially-recognized command value. In exemplary embodiments, the command system 204 and/or the voice command recognition application 240 utilizes the current operational context to identify or otherwise determine an expected value for the identified operational subject. For example, the command system 204 and/or the voice command recognition application 240 may analyze the preceding ATC clearance communications from the clearance table 226 to identify a previously-communicated value for the operational subject as the expected value for the recognized voice command. As another example, the command system 204 and/or the voice command recognition application 240 may utilize the current flight plan, the current aircraft procedure, the current checklist, the current standard operating procedure or the like to identify the expected value for the recognized voice command as a value specified by the current flight plan, the current aircraft procedure, the current checklist, the current standard operating procedure or the like.

For example, continuing the above example where a waypoint is identified as the operational subject, the command system 204 and/or the voice command recognition application 240 may utilize the current geographic location of the aircraft with respect to the flight plan to identify the next waypoint of the flight plan ahead of the current geographic location within the flight plan as an expected waypoint identifier value to be suggested as a potential alternative to the recognized waypoint identifier value. As another example, when the aircraft is currently flying or otherwise operating in accordance with a particular procedure, the voice command recognition application 240 may query a procedure database to identify the waypoints associated with or otherwise specified for the procedure currently being flown and then utilize the current geographic location of the aircraft to identify the procedure waypoint nearest to the current geographic location of the aircraft as an expected waypoint identifier value. As yet another example, command system 204 and/or the voice command recognition application 240 may utilize the current conversational context associated with the aircraft to identify a previously communicated waypoint identifier value within a preceding ATC clearance instruction directed to the ownship aircraft or within a request or confirmation communicated to the ATC by the pilot as the expected waypoint identifier value.

In some embodiments, the voice command recognition application 240 may also utilize acoustic similarity to identify potential alternative values. For example, the voice command recognition application 240 may identify the waypoint of the flight plan or aircraft procedure that is most acoustically similar to the initially-recognized waypoint identifier value and/or the received audio for the input voice command. In some embodiments, the voice command recognition application 240 may utilize the probability values, acoustic scores or other confidence values associated with the initial recognition of the input voice command to identify the nearest or next most probable waypoint identifier values that were identified based on acoustic similarity with the received voice command audio that are also viable, feasible, or otherwise logically consistent with the current operational context. In this regard, in some embodiments, the voice command recognition application 240 may exclude from consideration as potential alternative values any potential values for the operational subject that are not viable (e.g., when a particular runway is inactive or closed), not feasible (e.g., when the current amount of fuel remaining onboard the aircraft prevents the aircraft from reaching the particular waypoint), or are otherwise logically inconsistent with the current operational context (e.g., when the potential value is associated with an aircraft procedure or flight phase that is inconsistent with the current aircraft configuration). It should be appreciated that there are numerous different ways in which the current operational context may be utilized to identify potential alternative values, and the subject matter is not intended to be limited to any particular implementation or combination.

Still referring to FIG. 3, after determining one or more potential alternative values for the identified operational subject, the contextual editing process 300 displays or otherwise provides selectable graphical indicia of the potential alternative value(s) to allow a pilot or other user to substitute a selected potential alternative value for the initially-recognized command value for the identified operational subject (task 312). For example, for each potential alternative value, the command system 204 and/or the voice command recognition application 240 may generate or otherwise provide a button or similar GUI element that includes a graphical representation of a potential alternative value for the identified operational subject. Additionally, the graphical indicia of the potential alternative value(s) may include graphical indicia of the source from which the respective alternative value was obtained. For example, the command system 204 and/or the voice command recognition application 240 may determine a first expected alternative value for the identified operational subject based on the preceding ATC clearance communications and provide a corresponding button associated therewith that includes a graphical representation of that first expected alternative value and identifies the ATC clearance communications as the source utilized to derive or otherwise determine the expected value for the identified operational subject. Similarly, the command system 204 and/or the voice command recognition application 240 may determine a second expected alternative value for the identified operational subject based on the current flight plan and provide a corresponding button associated therewith that includes a graphical representation of that second expected alternative value and identifies the flight plan as the source utilized for that respective expected value. In this manner, the contextual editing process 300 provides explanatory guidance regarding the expected alternative values, which, in turn, may be utilized by the pilot or other user to assist identification of the desired command value for the identified operational subject.

In response to selection of a potential alternative value for the identified operational subject, the contextual editing process 300 automatically modifies the input voice command to include the selected value instead of the initially-recognized value and then generates or otherwise provides one or more output signal(s) for the appropriate destination onboard system(s) to implement the modified input voice command using the selected value (tasks 314, 316). For example, continuing the above example, after the pilot selects an alternative value for the waypoint identifier associated with the hold command, the voice command recognition application 240 generates one or more corresponding output command signals for implementing the hold action at the selected waypoint and provides the output signal(s) to the appropriate destination onboard system(s) 210 (e.g., the FMS 114) to implement or otherwise execute the hold action in connection with the selected waypoint.

FIGS. 4-5 depict an exemplary sequence of voice command GUI displays 400, 500 suitable for presentation by the processing system 106 and/or the command system 204 on a display device 102 onboard an aircraft 120 in connection with the contextual editing process 300 of FIG. 3. FIG. 4 depicts an initial state of the voice command GUI display 400 that includes a graphical representation 402 of the recognized input voice command ("Open Approach Chart ILS27") (e.g., tasks 302, 304). In the illustrated embodiment, in response to user selection of the recognized command value ("ILS27) for the runway identifier associated with the open approach chart command, the processing system 106 and/or the command system 204 identifies the runway as the operational subject of the input voice command (e.g., task 306). That said, in other embodiments, the processing system 106 and/or the command system 204 may automatically analyze the recognized input voice command using natural language processing or other techniques to identify the runway identifier value (or the procedure name value for the approach procedure) as the parameter value associated with the operational subject of the input command that is capable of being edited.

After identifying the operational subject of the recognized input voice command for potential editing, the processing system 106 and/or the command system 204 identifies or otherwise determines the current operational context associated with the aircraft 120 at the time of receipt of the recognized input voice command (e.g., task 308), for example, by obtaining data or other information indicative of the current geographic location, altitude and/or the like from the onboard navigation system 112, 210, obtaining the current conversational context from the clearance table 226 maintained in a data storage element 118, 224, obtaining information indicative of the current flight plan, the current flight phase and/or the like from the FMS 114, 210, obtaining information indicative of the current configuration of the aircraft 120 from one or more onboard avionics systems 116, 210, and so on. In this regard, it should be appreciated that the subject matter described herein is not limited to any particular type of contextual information and/or source of contextual information that may be utilized to determine an expected or alternative parameter value for an operational subject, or any particular combination of contextual information.

After obtaining the current operational context, the processing system 106 and/or the command system 204 identifies or otherwise determines one or more alternative values for the runway identifier based on the current operational context (e.g., task 310). For example, in the illustrated embodiment, the processing system 106 and/or the command system 204 utilizes the current flight plan obtained from the FMS 114, 210 to identify runway 27-L as the planned runway for landing the aircraft 120, and based thereon, determine that the expected value for the runway identifier (or the expected procedure name) that is the operational subject of the open approach chart command to be "ILS27-L." The processing system 106 and/or the command system 204 automatically generates or otherwise provides a button 404 or similar selectable GUI element associated with the expected runway identifier value that includes a graphical representation of the expected runway identifier value along with graphical indicia that the expected runway identifier value was determined using the current flight plan (e.g., task 312). Additionally, in the illustrated embodiment, the processing system 106 and/or the command system 204 utilizes the current flight plan obtained from the FMS 114, 210 to identify the destination airport for the aircraft 120, and based thereon, obtains the procedure information associated with the destination airport from a database 118 including procedure information for different airports to identify another potential alternative value for the runway identifier that is the operational subject of the open approach chart command. For example, the processing system 106 and/or the command system 204 may analyze potential runway identifier values for the destination airport to identify an alternative runway identifier value (e.g., "27-R") that is acoustically similar to the initially-recognized runway identifier value but different from the initially-recognized runway identifier value or the expected runway identifier value derived from the flight plan. In a similar manner, the processing system 106 and/or the command system 204 automatically generates or otherwise provides a button 406 or similar selectable GUI element associated with the next most likely or expected alternative runway identifier value (or procedure name) that includes a graphical representation of the expected runway identifier value along with graphical indicia that the expected runway identifier value was determined using a procedure database or other navigational database.

Referring to FIG. 5 with continued reference to FIGS. 1-4, in response to user selection of the button 404 associated with the expected runway identifier value of 27-L for the instrument landing system (ILS) approach procedure that is the operational subject of the open approach chart command, the processing system 106 and/or the command system 204 modifies input voice command by substituting the expected value of "ILS27-L" selected by the user for the initially-recognized value of "ILS27" within the textual representation of the voice command (e.g., task 314) and then dynamically generates an updated voice command GUI display 500 including an updated graphical representation 502 of the manually-edited input voice command that includes the user-selected expected value for the operational subject of the input voice command in lieu of the initial value for the operational subject that was recognized based on the received input voice command audio. In some embodiments, the processing system 106 and/or the command system 204 automatically generates corresponding output commands, signals, or other instructions for implementing the modified, manually-edited input voice command using the user-selected value before outputting, transmitting, or otherwise providing the corresponding command signals to the appropriate onboard system 210 (e.g., task 316). For example, in the illustrated example, the processing system 106 and/or the command system 204 generates a command for opening the ILS approach chart associated with runway 27-L at the planned destination airport and then transmits or otherwise provides the corresponding open approach chart command to the display system 108, 210, which, in turn generates or otherwise provides an approach chart GUI display on a display device 102 that depicts the ILS approach associated with runway 27-L at the planned destination airport. In some embodiments, rather than automatically implementing the manually-edited, modified voice command, the processing system 106 and/or the command system 204 may delay execution of the voice command until user selection of a button 408 or similar selectable GUI element that indicates that the user has verified or otherwise confirmed that the depicted voice command 502 is correct and accurately captures the operator's intent. In this manner, execution of an incorrect or inaccurate voice command may be prevented.

FIG. 6 depicts another exemplary voice command GUI display 600 suitable for presentation by the processing system 106 and/or the command system 204 on a display device 102 onboard an aircraft 120 in connection with the contextual editing process 300 of FIG. 3. FIG. 6 depicts an initial state of the voice command GUI display 600 that includes a graphical representation 602 of the recognized input voice command ("Set Cruise Altitude 70000") (e.g., tasks 302, 304). After identifying the altitude value as the operational subject of the input voice command (e.g., task 306), the processing system 106 and/or the command system 204 identifies or otherwise determines the current operational context associated with the aircraft 120 at the time of receipt of the recognized input voice command and determines an expected value for the altitude value based on the current operational context (e.g., tasks 308, 310). In this regard, FIG. 6 depicts a scenario where the processing system 106 and/or the command system 204 utilizes the current operational context and the sequence of ATC clearance communications maintained in the clearance table 226 to determine an expected value for the altitude value, for example, by identifying an assigned altitude value of 17000 within a preceding ATC instruction for the ownship aircraft, identifying a requested altitude value of 17000 within a preceding request transmitted to the ATC by the pilot of the ownship aircraft, or identifying or otherwise deriving the altitude value of 17000 from one or more ATC clearance communications associated with other aircraft operating within the same airspace. For example, when preceding ATC communications indicate that the altitude value of 17000 has been previously assigned to other aircraft at or within a threshold distance of the current geographic location of the ownship aircraft, the processing system 106 and/or the command system 204 may determine that the altitude value of 17000 is expected based on the current geographic location and/or other contextual operational information associated with the ownship aircraft, and/or based on acoustic similarity with the initially-recognized altitude value of 70000.

In a similar manner as described above in the context of FIGS. 4-5, the processing system 106 and/or the command system 204 automatically generates or otherwise provides a button 604 or similar selectable GUI element associated with the expected altitude value that includes a graphical representation of the expected altitude value along with graphical indicia that the expected altitude value was determined based on transcriptions of preceding ATC clearance communications (e.g., task 312). In response to user selection of the button 604 associated with the expected altitude value, the processing system 106 and/or the command system 204 modifies input voice command by substituting the expected value of "17000" selected by the user for the initially-recognized value of "70000" within the textual representation of the voice command (e.g., task 314). In a similar manner as described above in the context of FIG. 5, the processing system 106 and/or the command system 204 may then dynamically generate an updated voice command GUI display including an updated graphical representation of the manually-edited input voice command that includes the user-selected expected value for the operational subject of the input voice command in lieu of the initial value for the operational subject that was recognized based on the received input voice command audio (e.g., "SET CRUISE ALTITUDE 17000"). The processing system 106 and/or the command system 204 then generates corresponding output commands, signals, or other instructions for setting the cruise altitude to the modified, manually-selected (or manually-edited) value of 17000 feet before outputting, transmitting, or otherwise providing the corresponding command signals to the appropriate onboard system 210 for controlling the cruise altitude of the aircraft (e.g., the FMS 114, an autopilot system 116, and/or another onboard avionics system 116).

Referring again to FIG. 3, in exemplary embodiments, the contextual editing process 300 stores, maintains or otherwise logs the modified, manually-edited input voice command that includes the user-selected alternative value in lieu of an initially-recognized value in association with the received input voice command audio for updating or training one or more voice command recognition models for subsequent operation using the user-selected alternative value (task 318). For example, different matched pairs of received input voice command audio content and corresponding user-validated, manually-edited input voice commands may provide a set of training data that may be utilized to adaptively and/or dynamically adjust one or more of the acoustic model and the language model utilized by the voice command recognition application 240. In one implementation, once a pilot has selected or otherwise manually edited the value for an operational subject of an input voice command, the command system 204 and/or the voice command recognition application 240 may store or otherwise maintain the user-validated and user-selected command value in association with a timestamp or other unique identifier that supports an association between that command value and the corresponding speech or audio that was enunciated by that user to input that value (e.g., using non-volatile memory or other built-in test equipment). The resulting set of the user-validated, user-selected command values (or user-validated voice commands) and corresponding voice command audio segments may then be utilized to generate training data that is fed or otherwise input to the acoustic model and/or the language model for the voice command recognition application 240 to adjust or otherwise fine tune variables, weighting factors, or other model parameters to improve recognition accuracy. For example, in one implementation, the portion of received input voice command audio content corresponding to the operational subject that was manually-edited is trimmed or otherwise copied into an audio file that is maintained in association with the initially-decoded commanded value that was modified along with the final user-validated, user-selected command value for that operational subject to create a log of potential training data sets. The resulting log of trimmed audio files and associated command values may then be utilized as training data to adaptively update, modify or otherwise adjust one or more model parameters to improve future recognition accuracy when substantially similar input voice command audio content is received in the future (e.g., by updating the model to initially decode the same input voice command audio content to the user-validated, user-selected command value the next time that input voice command audio content is received).

To briefly summarize, by virtue of the subject matter described herein, a recognized (or transcribed) input voice command is displayed in an editable manner on a GUI display that includes selectable GUI elements associated with alternative values for manual substitution in lieu of an initially-recognized value within the input voice command before execution of the voice command. By automatically and contextually populating the selectable GUI elements with alternative values that would otherwise be expected given the current operational context, the subject matter allows a pilot or other vehicle operator to quickly correct the input voice command to include the intended or desired value. In addition to improving the user experience (e.g., by ensuring the correct command is executed or implemented) and minimizing pilot workload when modifying an input voice command, the correct, validated input voice command may be utilized to create an additional corpus for training or otherwise updating the speech recognition models in a closed-loop manner using training data reflects real-world scenarios (e.g., audio segments corresponding to realistic voice command phraseology or syntax from pilots, co-pilots, etc.) and real-world operating environments (e.g., ambient cockpit noise, an ATC setting, etc.). In this manner, the subject matter allows for the speech recognition models to be dynamically and adaptively updated to improve recognition accuracy over time using the validated, user-edited voice command corrections and corresponding audio segments.

For the sake of brevity, conventional techniques related to user interfaces, speech recognition, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/ node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of a vehicle, the method comprising:
   recognizing an audio input as an input voice command, resulting in a recognized input voice command, wherein the recognized input voice command comprises a recognized commanded value for an operational subject within the input voice command;
   after recognizing the audio input as the input voice command:
   automatically identifying, within the recognized input voice command, the operational subject of the recognized input voice command for editing; and
   after identifying the operational subject of the recognized input voice command for editing:
   automatically identifying a first alternative value for the operational subject of the recognized input voice command from a preceding instruction from an air traffic controller (ATC), wherein the first alternative value is different from the recognized commanded value for the operational subject within the recognized input voice command; and
   automatically identifying a second alternative value for the operational subject of the recognized input voice command from a navigational database;
   providing a graphical representation of the recognized input voice command including the recognized commanded value for the operational subject on a graphical user interface (GUI) display;
   in response to user selection of the graphical representation of the recognized input voice command on the GUI display, providing, on the GUI display, selectable GUI elements associated with the operational subject to edit the recognized commanded value for the operational subject of the recognized input voice command, wherein the selectable GUI elements comprise a first graphical representation of the first alternative value for the operational subject and a first graphical indication of the ATC associated with the first alternative value and a second graphical representation of the second alternative value and a second graphical indication of the navigational database associated with the second alternative value; and after user selection of a selectable GUI element of the selectable GUI elements on the GUI display to edit the recognized commanded value for the operational subject of the recognized input voice command by substituting one of the first alternative value and the second alternative value selected by the user for the recognized commanded value, providing a command to a destination system associated with the vehicle to execute an augmented voice command using the one of the first alternative value and the second alternative value selected by the user for the operational subject.

2. The method of claim 1, wherein the one of the first alternative value and the second alternative value for the operational subject comprises an expected value for the operational subject identified using a current operational context.

3. The method of claim 2, wherein identifying the expected value comprises querying a data storage element using the current operational context to obtain the expected value for the operational subject.

4. The method of claim 3, wherein:

querying the data storage element comprises querying the data storage element for a specified value for the operational subject associated with the current operational context; and the current operational context comprises at least one of a current geographic location, a current flight phase, a current aircraft procedure, or a current aircraft action.

5. The method of claim 1, wherein automatically identifying the first alternative value for the operational subject comprises determining an expected value for the operational subject based at least in part on one or more preceding audio communications.

6. The method of claim 5, further comprising obtaining a transcription of the one or more preceding audio communications, wherein determining the expected value comprises automatically identifying the expected value within the transcription of the one or more preceding audio communications.

7. The method of claim 6, wherein automatically identifying the expected value within the transcription of the one or more preceding audio communications comprises automatically identifying the expected value within the transcription of a preceding audio communication prior to receiving the audio input from an audio input device onboard the vehicle.

8. The method of claim 7, wherein:

the expected value comprises a specified value for the operational subject within the preceding audio communication; and the preceding audio communication comprises an air traffic control (ATC) clearance or an automatic terminal information service (ATIS) broadcast.

9. The method of claim 1, wherein:

the vehicle comprises an aircraft; and the one of the first alternative value and the second alternative value for the operational subject comprises determining an expected value for the operational subject determined based at least in part on a flight plan for the aircraft.

10. The method of claim 1, wherein automatically identifying the one of the first alternative value and the second alternative value for the operational subject comprises:

identifying a plurality of potential values for the operational subject; and selecting an expected value from among the plurality of potential values based on a respective confidence value associated with the expected value.

11. The method of claim 10, wherein:

recognizing the audio input comprises recognizing the recognized commanded value as a first value of the plurality of potential values having a highest confidence value associated therewith; and selecting the expected value comprises selecting a second value of the plurality of potential values having a second highest confidence value associated therewith from among the plurality of potential values for use as the expected value.

12. The method of claim 1, further comprising obtaining a current operational context associated with the vehicle; wherein the one of the first alternative value and the second alternative value comprises an expected value associated with the current operational context.

13. The method of claim 1, further comprising automatically updating the graphical representation of the input voice command to include the one of the first alternative value and the second alternative value in lieu of the recognized commanded value in response to selection of the selectable GUI element.

14. The method of claim 1, wherein the navigational database comprises a procedure database.

15. The method of claim 1, the augmented voice command comprising a manually-edited, modified voice command comprising the one of the first alternative value and the second alternative value selected by the user for the operational subject, the method further comprising dynamically adjusting a voice command recognition model using a matched pair of the audio input and the manually-edited, modified voice command corresponding to the audio input.

16. A non-transitory computer-readable medium having computer-executable instructions stored thereon that, when executed by a processing system, cause the processing system to:

recognize an audio input as an input voice command, resulting in a recognized input voice command comprising a recognized commanded value for an operational subject within the input voice command;

after recognizing the audio input as the input voice command:

automatically identify, within the recognized input voice command, the operational subject of the recognized input voice command for editing; and after identifying the operational subject of the recognized input voice command for editing, automatically identify a first alternative value different from the recognized commanded value for the operational subject of the recognized input voice command from a preceding instruction from an air traffic controller (ATC), wherein the first alternative value is different from the recognized commanded value for the operational subject within the recognized input voice command, and automatically identify a second alternative value for the operational subject of the recognized input voice command from a navigational database;

provide a graphical representation of the recognized input voice command including the recognized commanded value for the operational subject on a graphical user interface (GUI) display;

in response to user selection of the graphical representation of the recognized input voice command on the GUI display, provide, on the GUI display, selectable GUI elements associated with the operational subject to edit the recognized commanded value for the operational subject of the recognized input voice command, wherein the selectable GUI elements comprise a first graphical representation of the first alternative value for the operational subject and a first graphical indication of the ATC associated with the first alternative value and a second graphical representation of the second alternative value and a second graphical indication of the navigational database associated with the second alternative value; and after user selection of a selectable GUI element of the selectable GUI elements on the GUI display to edit the recognized commanded value for the operational subject of the recognized input voice command by substituting one of the first alternative value and the second alternative value selected by the user for the recognized commanded value, provide a command to a destination system to execute an augmented voice command using the one of the first alternative value and the second alternative value selected by the user for the operational subject in response to selection of the selectable GUI element to edit the recognized input voice command.

17. A voice command recognition system comprising:
a system associated with a vehicle to provide information indicative of a current operational context for the vehicle;
an audio input device receive input voice command audio; and
a processing system coupled to the system and the audio input device to:
recognize the input voice command audio as an input voice command, resulting in a recognized input voice command including a recognized commanded value for an operational subject within the input voice command;
after recognizing the input voice command audio as the input voice command:

automatically identify, within the recognized input voice command, the operational subject of the recognized input voice command for editing; and
after identifying the operational subject of the recognized input voice command for editing, automatically identify a first alternative value for the operational subject of the recognized input voice command from a preceding instruction from an air traffic controller (ATC) based at least in part on the current operational context, wherein the first alternative value is different from the recognized commanded value for the operational subject within the recognized input voice command, and automatically identify a second alternative value for the operational subject of the recognized input voice command from a navigational database;
provide a graphical representation of the recognized input voice command including the recognized commanded value for the operational subject on a graphical user interface (GUI) display;
in response to user selection of the graphical representation of the recognized input voice command on the GUI display, provide, on the GUI display, selectable GUI elements associated with the operational subject to edit the recognized commanded value for the operational subject of the recognized input voice command, wherein the selectable GUI elements comprise a first graphical representation of the first alternative value for the operational subject and a first graphical indication of the ATC associated with the first alternative value and a second graphical representation of the second alternative value and a second graphical indication of the navigational database associated with the second alternative value; and
after user selection of a selectable GUI element of the selectable GUI elements on the GUI display to edit the recognized commanded value for the operational subject of the recognized input voice command by substituting one of the first alternative value and the second alternative value selected by the user for the recognized commanded value, provide a command to a destination system associated with the vehicle to execute an augmented voice command using the one of the first alternative value and the second alternative value selected by the user for the operational subject.

* * * * *